United States Patent
Karpov et al.

(10) Patent No.: US 10,123,245 B2
(45) Date of Patent: Nov. 6, 2018

(54) DETERMINING A CORE NETWORK GATEWAY BASED ON A TRACKING AREA OR A CELL OF A USER DEVICE

(71) Applicant: Verizon Patent and Licensing Inc., Arlingon, VA (US)

(72) Inventors: Sergei Karpov, San Ramon, CA (US); Sudhakar Reddy Patil, Flower Mound, TX (US); Sagiv Draznin, Walnut Creek, CA (US)

(73) Assignee: Verizon Patent ad Licensing Inc., Basking Ridge, NJ (US)

( * ) Notice: Subject to any disclaimer, the term of this patent is extended or adjusted under 35 U.S.C. 154(b) by 113 days.

(21) Appl. No.: 15/070,431

(22) Filed: Mar. 15, 2016

(65) Prior Publication Data
US 2017/0272991 A1    Sep. 21, 2017

(51) Int. Cl.
| | |
|---|---|
| H04W 4/00 | (2018.01) |
| H04W 36/14 | (2009.01) |
| H04W 4/021 | (2018.01) |
| H04W 36/00 | (2009.01) |

(52) U.S. Cl.
CPC ........... *H04W 36/14* (2013.01); *H04W 4/021* (2013.01); *H04W 36/0016* (2013.01)

(58) Field of Classification Search
CPC .. H04W 36/14; H04W 36/0016; H04W 4/021
USPC ....................................................... 370/331
See application file for complete search history.

(56) References Cited

U.S. PATENT DOCUMENTS

| | | | | |
|---|---|---|---|---|
| 2011/0261787 | A1* | 10/2011 | Bachmann | H04L 63/029 370/331 |
| 2012/0230191 | A1* | 9/2012 | Fang | H04W 36/22 370/235 |
| 2015/0103738 | A1* | 4/2015 | Venkatraman | H04W 48/20 370/328 |
| 2016/0037328 | A1* | 2/2016 | Raveendran | H04W 8/08 370/328 |
| 2016/0277978 | A1* | 9/2016 | Tan Bergstrom | H04W 36/0061 |
| 2017/0188398 | A1* | 6/2017 | Youn | H04W 8/12 |

* cited by examiner

*Primary Examiner* — Mang Hang Yeung (57) ABSTRACT

A device may receive relationship information indicating a relationship between first geographic information and a network gateway. The network gateway may be associated with providing a user device with access to a network. The device may store the relationship information. The device may receive, from the user device and via a base station, second geographic information indicating a tracking area in which the user device is located. The device may identify one or more network gateways, associated with the second geographic information, based on the second geographic information and the relationship information. The device may provide, to the user device, one or more device identifiers associated with the one or more network gateways to permit the user device to access the network via the one or more network gateways. The one or more device identifiers may be provided in association with a non-access stratum message.

20 Claims, 4 Drawing Sheets

DETERMINING A CORE NETWORK GATEWAY BASED ON A TRACKING AREA OR A CELL OF A USER DEVICE

BACKGROUND

A tracking area may include a set of cells. Tracking areas may be grouped into lists of tracking areas (TA lists), which a mobility management entity (MME) may configure on a user device. The user device may perform tracking area updates periodically or when the user device moves to a tracking area that is not included in a TA list configured on the user device.

DETAILED DESCRIPTION OF PREFERRED EMBODIMENTS

The following detailed description of example implementations refers to the accompanying drawings. The same reference numbers in different drawings may identify the same or similar elements.

A device (e.g., a network element, such as a mobility management entity (MME)) may identify a core network gateway, such as an evolved packet data gateway (ePDG) device, that a user device is to use to access a core network via a wireless local area network (WLAN). In some cases, the MME may attempt to identify an appropriate ePDG device to be used by the user device based on a geographic proximity of the ePDG device and the user device (e.g., a closer distance to the user device, relative to another ePDG device). Identifying an ePDG device with a close geographic proximity to the user device may improve network communications by reducing network latency between the user device and the ePDG device. In addition, identifying an ePDG device with a close geographic proximity to the user device may improve network communications by reducing the distance that the network communications have to travel between the user device and the ePDG device.

One technique for identifying an ePDG device (e.g., a serving ePDG device) with a close geographic proximity to the user device may include using a geographic proximity of an ePDG device and a domain name system (DNS) server of the Internet Service Provider (ISP) used by the user device. In some cases, this technique may inaccurately identify the appropriate ePDG device, such as when the DNS server and the user device are geographically separated (e.g., because centralized or distributed DNS server(s) are used). Another technique for identifying an ePDG device with a close geographic proximity to the user device may include using an extensive database that stores associations between WLAN gateway devices (e.g., WLAN access points) and corresponding ePDG devices for the WLAN gateway devices. This technique may be resource intensive because storing and searching the associations may consume significant memory and/or computing resources.

Implementations described herein enable an MME to identify an ePDG device with a geographic proximity to a user device based on a tracking area and/or a cell (e.g., a serving cell) associated with the user device. In this way, the MME may identify an ePDG device that has a geographic proximity to a tracking area and/or a cell of the user device, thereby reducing network latency between the user device and the ePDG device, which may improve network communications associated with the user device. In addition, using a database that maps ePDG devices and tracking areas and/or cells may conserve memory and/or computing resources (e.g., relative to using a database that maps WLAN gateway devices and ePDG devices).

Figure 1:
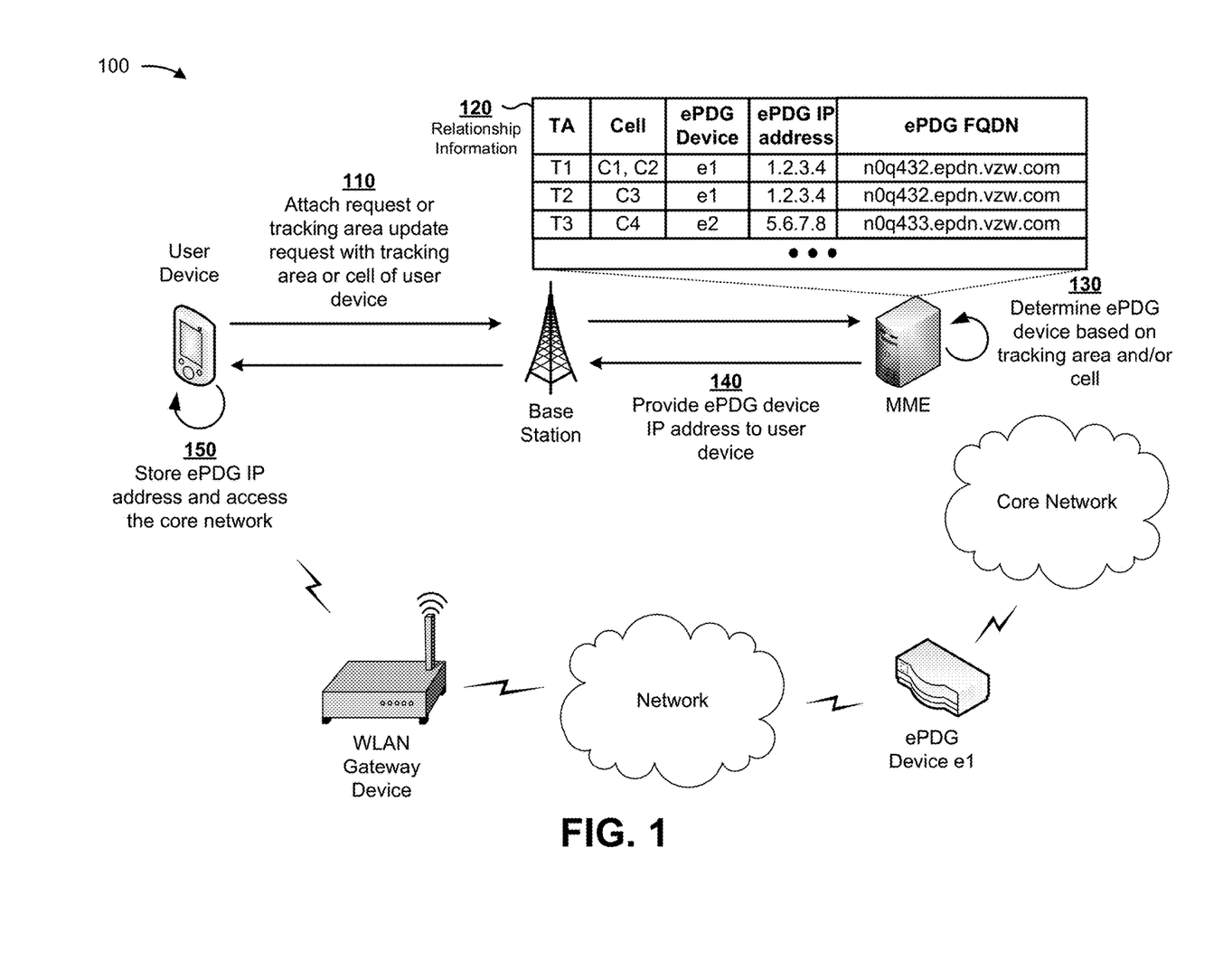
FIG. 1 is a diagram of an overview of an example implementation described herein.

FIG. 1 is a diagram of an overview of an example implementation 100 described herein. As shown in FIG. 1, and by reference number 110, an MME may receive, from a user device and via a base station (e.g., an eNodeB), an attach request and/or a tracking area update request that identifies a tracking area (e.g., a set of cells) or a cell (e.g., a coverage area) in which the user device is located. The MME may receive the attach request when the user device initially attempts to attach to the network. Additionally, or alternatively, the MME may receive the tracking area update request when the user device moves from a first cell to a second cell and/or moves from a first tracking area to a second tracking area. The attach request and/or the tracking area update request may include geographic information indicating the tracking area and/or the cell in which the user device is located.

As shown by reference number 120, the MME may store relationship information that includes tracking area identifiers (e.g., shown as "T1" through "T3"), which correspond to tracking areas, and cell identifiers associated with the tracking area identifiers (e.g., shown as "C1" through "C4"), which correspond to cells. In some implementations, multiple cell identifiers may be associated with a single tracking area identifier. For example, cell identifiers C1 and C2 may be associated with tracking area identifier T1, as shown.

The relationship information may further indicate a set of ePDG devices (e.g., shown as "e1" through "e2") that correspond to the tracking area identifiers and/or the cell identifiers. In some implementations, the association between the ePDG devices and the tracking area identifiers and/or the cell identifiers may indicate a geographic proximity of the ePDG devices to a tracking area and/or a cell represented by the tracking area identifiers and/or the cell identifiers, respectively. For example, the relationship information may indicate that ePDG device e1 is the closest ePDG device to tracking areas T1 and T2, based on ePDG device e1 being associated with tracking areas T1 and T2.

Additionally, or alternatively, the relationship information may include a device identifier that identifies the ePDG device, such as an internet protocol (IP) address (e.g., shown as "1.2.3.4" and "5.6.7.8"), a fully qualified domain name (FQDN) (e.g., shown as "n0q432.epdn.vzw.com" and "n0q433.epdn.vzw.com"), or the like. For example, the relationship information may indicate that the IP address of ePDG device e1 is 1.2.3.4. In some implementations, the MME may receive the relationship information based on input provided by a network administrator that loads or pre-configures the relationship information on the MME, as described in more detail below.

As shown by reference number 130, the MME may use the geographic information and the relationship information to determine an ePDG device that the user device is to use to access a core network, based on the tracking area identifier and/or the cell identifier received from the user device. For example, assume that the geographic information received from the user device indicates that the user device is located in tracking area T1. In this case, the MME may determine that ePDG device e1 is the ePDG device with the closest geographic proximity to the user device by comparing the tracking area identifier T1 received from the user device with the relationship information stored by the MME.

When determining the ePDG device associated with the tracking area identifier received from the user device, the MME may determine the device identifier associated with the ePDG device. For example, the MME may determine that the IP address associated with ePDG device e1 is 1.2.3.4. In some implementations, the MME may determine multiple ePDG devices and/or multiple device identifiers, as described in more detail below.

As shown by reference number 140, the MME may provide the IP address of ePDG device e1 to the user device. For example, the MME may provide the IP address to the user device in association with responding to a request from the user device. For example, the MME may provide the IP address in association with transmitting an ATTACH ACCEPT message and/or a TRACKING AREA UPDATE ACCEPT message in response to an ATTACH REQUEST message and/or a TRACKING AREA UPDATE REQUEST message from the user device.

As shown by reference number 150, the user device may store the received ePDG device IP address, and may use this IP address to access the core network via, for example, a WLAN gateway and the ePDG device. For example, the user device may store the IP address 1.2.3.4, and may use this IP address to select ePDG device e1 as a gateway to access the core network, as shown.

In this way, an MME may provide a device identifier associated with an ePDG device to a user device, based on identifying the ePDG device using geographic information from the user device, such as geographic information that identifies a tracking area and/or a cell in which the user device is located. This may enable the MME to determine an ePDG that has a geographic proximity to a tracking area and/or a cell of the user device (e.g., relative to other ePDG devices), which may improve network communications by reducing network latency. Additionally, this may improve accuracy of identifying the ePDG device, by using geographic information that indicates a location of the user device. Further, this may conserve memory and/or computing resources when identifying the ePDG device, by storing and searching fewer associations to identify the ePDG device (e.g., relative to storing and searching associations between all WLAN gateway devices and the ePDG devices), thereby providing a sufficient level of accuracy when selecting the ePDG device.

As indicated above, FIG. 1 is provided merely as an example. Other examples are possible and may differ from what was described with regard to FIG. 1. For example, in some implementations, the MME may use an FQDN associated with an ePDG device to identify a corresponding IP address associated with the ePDG device. In this case, the MME may provide the IP address to the user device for connecting to the ePDG device. As another example, in some implementations, the MME may provide an FQDN associated with an ePDG device to a user device, which the user device may use to identify a corresponding IP address associated with the ePDG device (e.g., by using relationship information stored on the user device).

Figure 2:
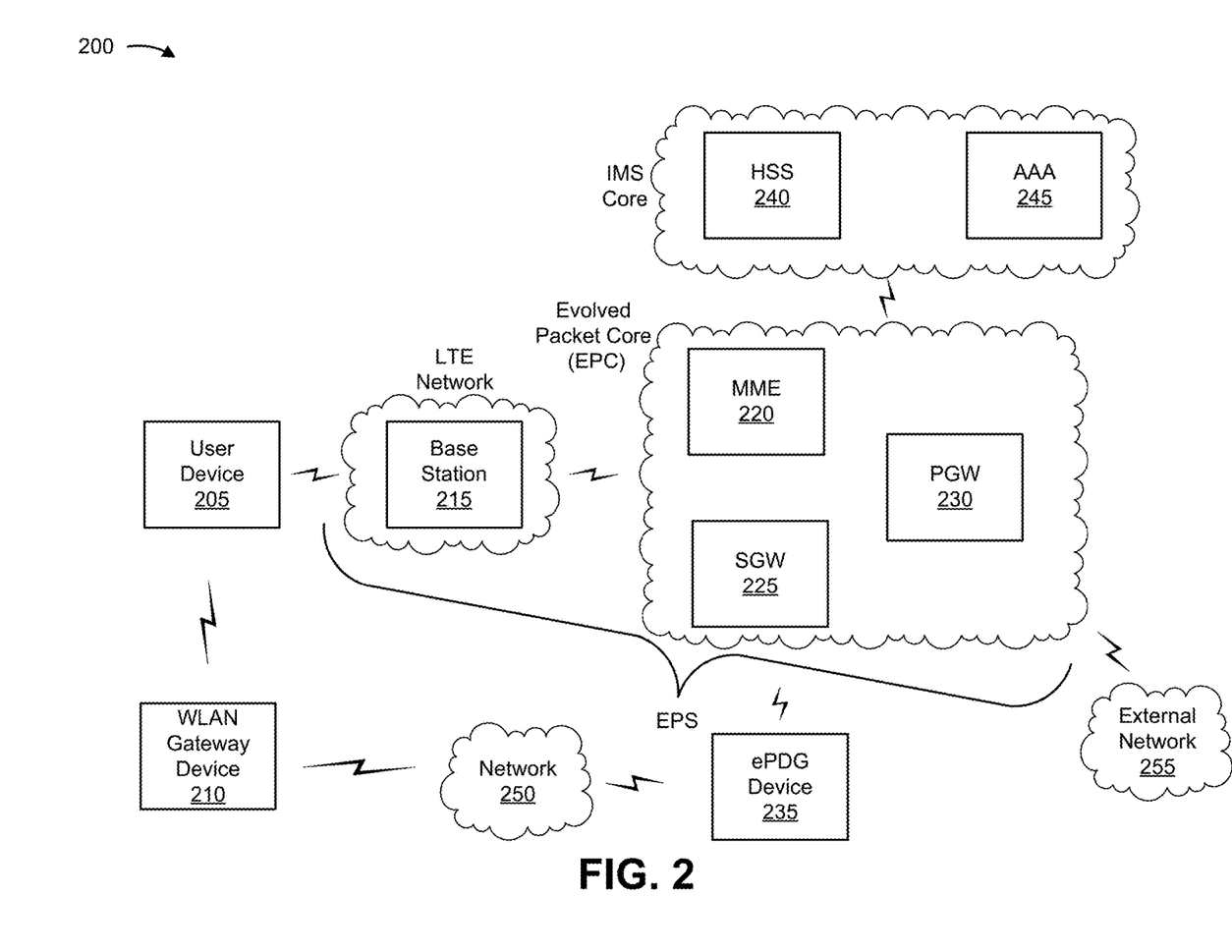
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a WLAN gateway device 210, a base station 215, a mobility management entity device (MME) 220, a serving gateway (SGW) 225, a packet data network gateway (PGW) 230, an evolved packet data gateway (ePDG) device 235, a home subscriber server (HSS) 240, an authentication, authorization, and accounting server (AAA) 245, a network 250, and an external network 255. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 215 that take the form of evolved Node Bs (eNBs) via which user device 205 communicates with the EPC. The EPC may include MME 220, SGW 225, PGW 230, and/or ePDG device 235 that enable user device 205 to communicate with a network and/or an IP multimedia subsystem (IMS) core. In some implementations, the EPC may be referred to as a core network. The IMS core may include HSS 240 and/or AAA 245, and may manage device registration and authentication, session initiation, etc., associated with user device 205. HSS 240 and/or AAA 245 may reside in the EPC and/or the IMS core.

User device 205 includes one or more devices capable of communicating with base station 215 and/or a network (e.g., network 250 and/or external network 255). For example, user device 205 may include a wireless communication device, a dual radio access device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. In some implementations, user device 205 may access the EPC via base station 215. Additionally, or alternatively, user device 205 may access the EPC via WLAN gateway device 210, network 250, and ePDG device 235.

WLAN gateway device 210 includes one or more devices capable of communicating wirelessly with local devices, such as user device 205, and providing connectivity, for local devices, to devices connected with network 250. For example, WLAN gateway device 210 may include a gateway, a WLAN access point, a router, a modem, a switch, a hub, a bridge, or a similar type of device. WLAN gateway device 210 may enable user device 205 to connect to and/or communicate with ePDG device 235 (e.g., via network 250).

Base station 215 includes one or more devices capable of transferring traffic, such as audio, video, text, and/or other traffic, destined for and/or received from user device 205. In some implementations, base station 215 may include an eNB associated with the LTE network that receives traffic from and/or sends traffic to external network 255 via SGW 225 and/or PGW 230. Additionally, or alternatively, one or more base stations 215 may be associated with a RAN that is not associated with the LTE network. Base station 215 may send traffic to and/or receive traffic from user device 205 via an air interface. In some implementations, base station 215 may include a small cell base station, such as a base station of a microcell, a picocell, and/or a femtocell.

MME 220 includes one or more devices, such as one or more server devices, capable of managing authentication, activation, deactivation, and/or mobility functions associated with user device 205. In some implementations, MME 220 may perform operations relating to authentication of user device 205. Additionally, or alternatively, MME 220 may facilitate the selection of a particular SGW 225 and/or a particular PGW 230 to serve traffic to and/or from user device 205. MME 220 may perform operations associated with handing off user device 205 from a first base station 215 to a second base station 215 when user device 205 is transitioning from a first cell associated with the first base station 215 to a second cell associated with the second base station 215. Additionally, or alternatively, MME 220 may select another MME (not pictured), to which user device 205 should be handed off (e.g., when user device 205 moves out of range of MME 220).

SGW 225 includes one or more devices capable of routing packets. For example, SGW 225 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 225 may aggregate traffic received from one or more base stations 215 associated with the LTE network, and may send the aggregated traffic to external network 255 (e.g., via PGW 230) and/or other network devices associated with the EPC and/or the IMS core. SGW 225 may also receive traffic from external network 255 and/or other network devices, and may send the received traffic to user device 205 via base station 215. Additionally, or alternatively, SGW 225 may perform operations associated with handing off user device 205 to and/or from an LTE network.

PGW 230 includes one or more devices capable of providing connectivity for user device 205 to external packet data networks (e.g., other than the depicted EPC and/or LTE network), such as external network 255. For example, PGW 230 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 230 may aggregate traffic received from one or more SGWs 225, and may send the aggregated traffic to external network 255. Additionally, or alternatively, PGW 230 may receive traffic from external network 255, and may send the traffic to user device 205 via SGW 225 and base station 215. PGW 230 may record data usage information (e.g., byte usage), and may provide the data usage information to AAA 245.

ePDG device 235 includes one or more devices capable of providing user device 205 with access to the EPC via network 250. For example, ePDG device 235 may include a data processing and/or traffic transfer device, such as a gateway, a router, a modem, a switch, a firewall, a NIC, a hub, a bridge, a proxy server, or a similar type of device that processes and/or transfers traffic. In some implementations, ePDG device 235 may receive information from user device 205, via WLAN gateway device 210 and/or network 250, and may transmit the information to one or more other devices of the EPC. Additionally, or alternatively, ePDG device 235 may receive information from one or more other devices of the EPC, and may transmit the information to user device 205 via network 250 and/or WLAN gateway device 210. In some implementations, ePDG device 235 may be referred to as a core network gateway.

HSS 240 includes one or more devices, such as one or more server devices, capable of managing (e.g., receiving, generating, storing, processing, and/or providing) information associated with user device 205. For example, HSS 240 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, and/or a quantity of data consumption allowed per time period), and/or similar information. HSS 240 may provide this information to one or more other devices of environment 200 to support the operations performed by those devices.

AAA 245 includes one or more devices, such as one or more server devices, that perform authentication, authorization, and/or accounting operations for communication sessions associated with user device 205. For example, AAA 245 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, and/or read/write restrictions), may track resources consumed by user device 205 (e.g., a quantity of voice minutes consumed and/or a quantity of data consumed), and/or may perform similar operations.

Network 250 includes one or more wired and/or wireless networks. For example, network 250 may include a public land mobile network (PLMN), a local area network (LAN), a WLAN (e.g., a Wi-Fi network), a wide area network (WAN), a metropolitan area network (MAN), a telephone network (e.g., a Public Switched Telephone Network (PSTN)), a private network, an ad hoc network, an intranet, the Internet, a fiber optic-based network, a cloud computing network, and/or a combination of these or other types of networks. In some implementations, user device 205 may access network 250 via WLAN gateway device 210, and may communicate with ePDG device 235 via network 250.

External network 255 includes one or more wired and/or wireless networks. For example, external network 255 may include a cellular network (e.g., an LTE network, a 3G network, and/or a code division multiple access (CDMA) network), a PLMN, a LAN, a WLAN, a WAN, a MAN, a telephone network (e.g., a PSTN), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
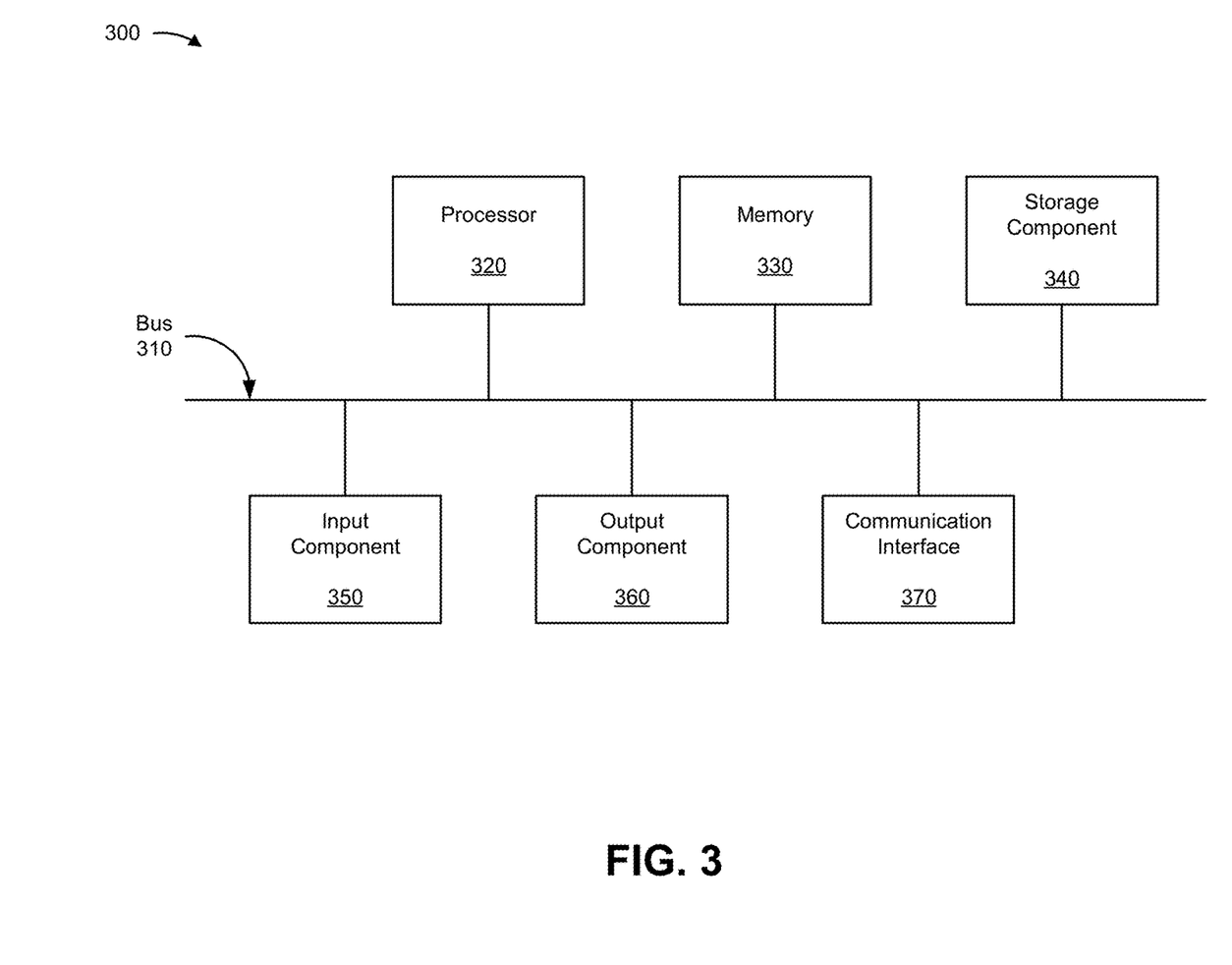
FIG. 3 is a diagram of example components of one or more devices of FIG. 2.

FIG. 3 is a diagram of example components of a device 300. Device 300 may correspond to user device 205, WLAN gateway device 210, base station 215, MME 220, SGW 225, PGW 230, ePDG device 235, HSS 240, and/or AAA 245. In some implementations, user device 205, WLAN gateway device 210, base station 215, MME 220, SGW 225, PGW 230, ePDG device 235, HSS 240, and/or AAA 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver, and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
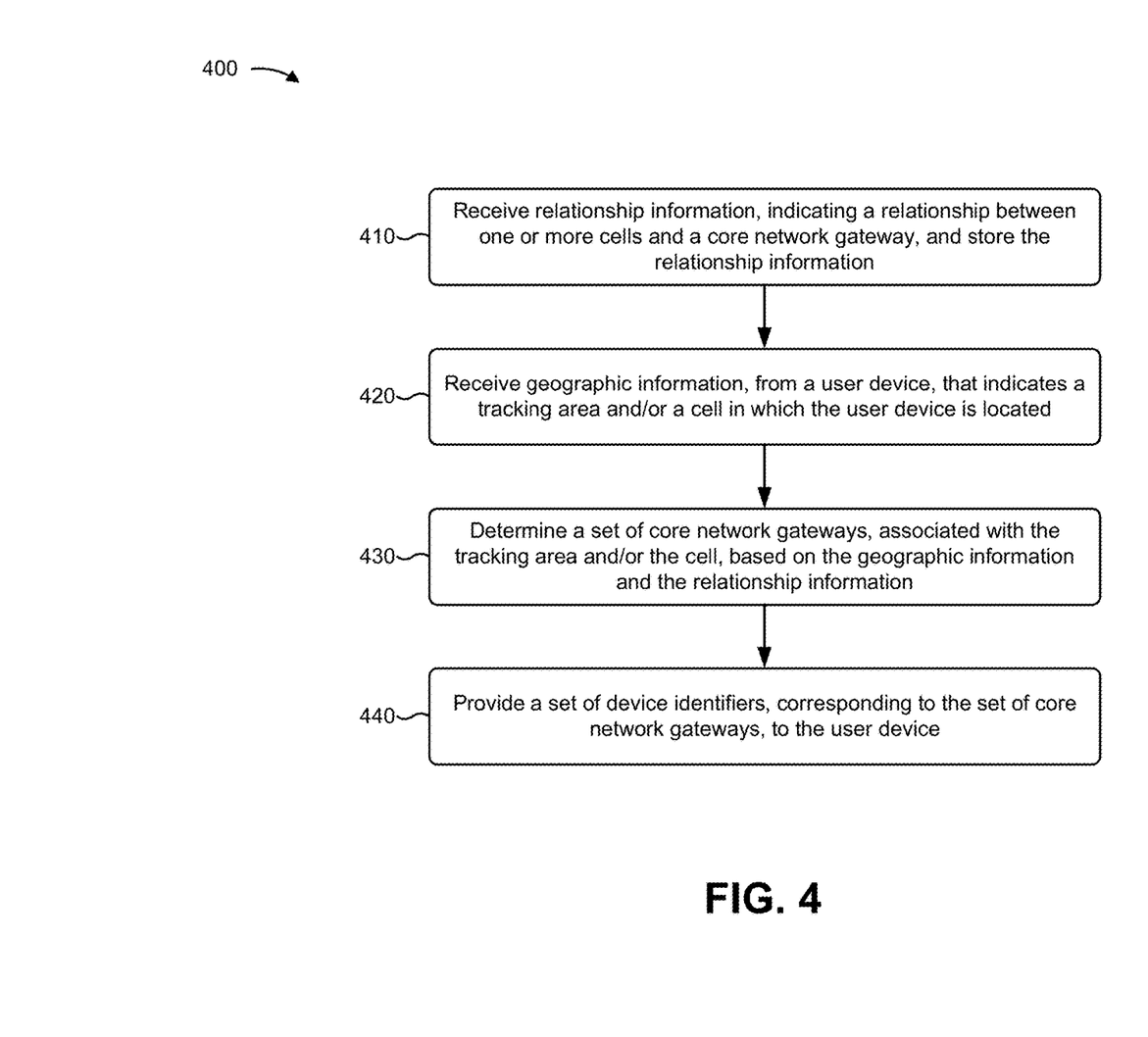
FIG. 4 is a flow chart of an example process for determining a core network gateway based on a tracking area or a cell of a user device.

FIG. 4 is a flow chart of an example process 400 for determining a core network gateway based on a tracking area or a cell of a user device. In some implementations, one or more process blocks of FIG. 4 may be performed by MME 220. In some implementations, one or more process blocks of FIG. 4 may be performed by another device or a group of devices separate from or including MME 220, such as user device 205, WLAN gateway device 210, base station 215, SGW 225, PGW 230, ePDG device 235, HSS 240, and/or AAA 245.

As shown in FIG. 4, process 400 may include receiving relationship information, indicating a relationship between one or more cells and a core network gateway, and storing the relationship information (block 410). For example, MME 220 may receive relationship information. In some implementations, the relationship information may include a set of tracking area identifiers (e.g., a value, such as a number and/or a string) that identify a set of tracking areas served by ePDG device(s) 235. In some implementations, the relationship information may include a set of cell identifiers that identify a set of cells associated with the tracking area identifier(s) and/or a set of cells served by ePDG device(s) 235.

In some implementations, the relationship information may include a set of device identifiers that identify ePDG device(s) 235, such as an IP address (e.g., an IPv4 address or an IPv6 address), an FQDN, or the like. In some implementations, a device identifier may identify multiple ePDG devices (e.g., a group of ePDG devices) associated with a geographic area, which may permit load balancing and/or redundancy.

In some implementations, the relationship information may indicate a relationship between ePDG device 235 and one or more cells identified using one or more cell identifiers. Additionally, or alternatively, the relationship information may indicate a relationship between ePDG device 235 and a group of cells (e.g., a tracking area) identified using a tracking area identifier. Additionally, or alternatively, the relationship information may indicate a geographic proximity between one or more cells and ePDG device 235. For example, an association between ePDG device 235 and a cell may indicate that the associated ePDG device 235 has a closer geographic proximity to the cell (e.g., relative to other ePDG devices 235), which may improve network communications by reducing network latency of network communications between the cell and ePDG device 235.

In some implementations, a particular ePDG device 235 may serve multiple cells and/or tracking areas. For example, a particular ePDG device 235 may be located in closer geographic proximity to multiple cells and/or tracking areas as compared to other ePDG devices 235. Additionally, or alternatively, different cells and/or tracking areas may be served by different ePDG devices 235.

In some implementations, MME 220 may receive updated relationship information as the relationship information changes. For example, MME 220 may receive an updated set of cell identifiers, tracking area identifiers, and/or associated device identifiers as ePDG devices 235 become available (e.g., are deployed in a network or are powered on) and/or become unavailable (e.g., are removed from a network or are powered off), which may conserve computing resources of user device 205 by preventing user device 205 from attempting to use an unavailable ePDG device 235 to access the EPC.

In some implementations, MME 220 may receive the relationship information based on input provided by a network administrator (e.g., a network operator), such as when the network administrator inputs the relationship information to MME 220. Additionally, or alternatively, MME 220 may request the relationship information from another device (e.g., a device that stores a master list of device identifiers and associated tracking area identifiers and/or cell identifiers). For example, MME 220 may provide information that identifies the tracking areas and/or cells serviced by MME 220, and may request that the other device provide the device identifiers associated with the tracking areas and/or cells serviced by MME 220. In some implementations, MME 220 may request the relationship information periodically (e.g., once per day). In some implementations, MME 220 may store the relationship information locally or on another device (e.g., may update the relationship information).

As further shown in FIG. 4, process 400 may include receiving geographic information, from a user device, that indicates a tracking area and/or a cell in which the user device is located (block 420). For example, MME 220 may receive geographic information, such as a tracking area identifier and/or a cell identifier, from user device 205. In some implementations, MME 220 may receive the geographic information in association with an attach request and/or a tracking area update request, which may be provided from user device 205 to MME 220 via base station 215.

In some implementations, the geographic information may indicate a geographic area in which user device 205 is located. For example, the geographic information may include a tracking area identifier, which may correspond to a tracking area in which user device 205 is located. As another example, the geographic information may include a cell identifier, which may correspond to a cell in which user device 205 is located.

As further shown in FIG. 4, process 400 may include determining a set of core network gateways, associated with the tracking area and/or the cell, based on the geographic information and the relationship information (block 430). For example, MME 220 may use the tracking area identifier and/or the cell identifier received from user device 205 to determine a particular ePDG device 235 that user device 205 is to use when accessing the EPC via WLAN gateway device 210. In some implementations, MME 220 may compare the tracking area identifier and/or the cell identifier received from user device 205 and a set of tracking area identifiers and/or cell identifiers associated with the device identifiers (e.g., stored in a data structure). In some implementations, MME 220 may identify a particular ePDG device 235 that user device 205 is to use when a result of the comparison indicates a match (e.g., when the tracking area identifier and/or the cell identifier, received from user device 205, is stored as relationship information).

In some implementations, MME 220 may use the most recently received tracking area identifier and/or cell identifier (e.g., relative to other tracking area identifiers and/or cell identifiers received from user device 205) to determine ePDG device 235 that user device 205 is to use to access the EPC. For example, user device 205 may not have current geographic information to transmit to MME 220. In this case, MME 220 may use geographic information previously received from user device 205 to determine ePDG device 235 that user device 205 is to use to access the EPC.

In some implementations, a tracking area and/or a cell may be associated with a single ePDG device 235. In some implementations, a tracking area and/or a cell may be associated with multiple ePDG devices 235. In some implementations, MME 220 may determine multiple ePDG devices 235 that user device 205 may use to access the EPC.

In some implementations, MME 220 may determine a priority (e.g., a priority level, such as high, medium, low) of ePDG devices 235 when MME 220 determines multiple ePDG devices 235. For example, MME 220 may determine a priority based on a geographic proximity of a tracking area and/or a cell of user device 205 to ePDG device 235, which may improve network communications by reducing network latency. For example, a first ePDG device 235 located closer to a tracking area and/or cell may be associated with a higher priority than a second ePDG device 235 located further from the tracking area and/or cell.

Additionally, or alternatively, MME 220 may determine a priority based on an amount of network traffic being transmitted via ePDG device 235, which may reduce congestion for a particular ePDG device 235 by reducing the amount of traffic being transmitted via the particular ePDG device 235. For example, a first ePDG device 235 with a lower amount of network traffic may be associated with a higher priority than a second ePDG device 235 with a higher amount of network traffic.

Additionally, or alternatively, MME 220 may determine a priority based on a quantity of user devices 205 using ePDG device 235, which may reduce congestion for a particular ePDG device 235 by reducing the quantity of user devices 205 using the particular ePDG device 235. For example, a first ePDG device 235 associated with a lower quantity of user devices 205 may be associated with a higher priority than a second ePDG device 235 associated with a higher quantity of user devices 205.

In some implementations, user device 205 may use the priority to determine a particular ePDG device 235 that user device 205 is to use to access the EPC. For example, user device 205 may attempt to connect to a first ePDG device 235 with a higher priority than a second ePDG device 235 prior to attempting to connect to the second ePDG device 235. In some implementations, MME 220 may determine ePDG devices 235 as user device 205 moves from one tracking area and/or cell to another tracking area and/or cell, based on user device 205 sending a tracking area update request upon moving to another tracking area and/or cell. This may enable MME 220 to dynamically determine ePDG device 235 with a geographic proximity to the tracking area and/or the cell of user device 205 as user device 205 moves between tracking areas and/or cells. Additionally, or alternatively, MME 220 may determine ePDG device 235 based on user device 205 periodically transmitting tracking area update requests, which may enable MME 220 to determine ePDG device 235 upon user device 205 request.

In some implementations, MME 220 may determine whether a service area associated with MME 220 (e.g., a geographic area serviced by MME 220) has an available ePDG device 235 prior to identifying ePDG device 235. For example, MME 220 may check whether ePDG capability is enabled in the service area of MME 220. This may conserve computing resources of MME 220 by preventing MME 220 from identifying ePDG device 235 when the service area associated with MME 220 does not support ePDG capability.

By using a tracking area identifier to identify ePDG device(s) 235, MME 220 may conserve computing resources by reducing a quantity of lookups (e.g., relative to using a cell identifier or another mechanism to identify ePDG device(s) 235), while still tying an ePDG mapping to a geographic area.

As further shown in FIG. 4, process 400 may include providing a set of device identifiers, corresponding to the set of core network gateways, to the user device (block 440). For example, MME 220 may provide a set of IP addresses for a set of ePDG devices 235 to user device 205. In some implementations, the set of device identifiers may include a single device identifier. In some implementations, the set of device identifiers may include multiple device identifiers. In some implementations, MME 220 may provide information that indicates a priority of the device identifiers.

In some implementations, MME 220 may provide the device identifiers in association with an attach accept message, a tracking area update accept message, a non-access stratum (NAS) protocol data unit (PDU), or the like. In some implementations, MME 220 may provide additional information associated with the device identifiers when providing the device identifiers, such as a quantity of device identifiers included in the message, a type of the device identifiers (e.g., IPv4, IPv6, and/or FQDN), or the like.

In some implementations, MME 220 may provide the device identifiers regardless of whether user device 205 is currently attempting to access the EPC via WLAN gateway device 210. For example, MME 220 may provide the device identifiers automatically when user device 205 requests to attach to the EPC and/or when user device 205 transmits a tracking area update request. In this way, user device 205 may store the device identifiers for use at a later time when user device 205 attempts to access the EPC via WLAN gateway device 210 (e.g., when access to the EPC via base station 215 may not be possible due to poor cellular coverage).

In some implementations, MME 220 may determine whether user device 205 is configured to use the device identifiers to access the EPC via ePDG device 235, prior to providing the device identifiers, which may conserve computing resources of MME 220 by preventing MME 220 from providing the device identifiers when user device 205 is not configured to use the device identifiers. In some implementations, user device 205 may store the device identifiers and use the device identifiers to access the EPC via the identified ePDG device 235.

In some implementations, user device 205 may receive multiple device identifiers and information indicating different priorities of the device identifiers. In this case, user device 205 may attempt to use the multiple device identifiers to access the EPC in an order indicated by the priorities of the device identifiers. For example, user device 205 may use a first device identifier with a higher priority than a second device identifier to attempt to access the EPC, prior to using the second device identifier to attempt to access the EPC.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable an MME to determine an ePDG device that a user device may use to access the EPC, based on a geographic proximity of a tracking area or a cell, in which the user device is located, and a location of the ePDG device. This may improve network communications by reducing network latency between the user device and the ePDG device. Additionally, this may increase accuracy of identifying an ePDG device with a close geographic proximity to the user device. Further, this may conserve memory and/or computing resources when storing and searching relationship information (e.g., relative to storing and searching associations between all WLAN gateway devices and ePDG devices).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, and/or a combination of related and unrelated items), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors, implemented at least partially in hardware, to:
receive geographic information, from a user device and via a base station, that indicates a tracking area in which the user device is located;
determine that evolved packet data gateway (ePDG) capability is enabled in a service area associated with the device;
determine a set of ePDG devices, associated with the tracking area, based on the geographic information and after determining that the ePDG capability is enabled in the service area associated with the device;
determine a priority based on geographic proximity of the tracking area or a cell of the user device to an ePDG device of the set of ePDG devices;
provide, to the user device, a set of device identifiers, corresponding to the set of ePDG devices,
the set of device identifiers being provided in a non-access stratum message, and
the set of device identifiers being used by the user device to access an evolved packet core; and
provide information that indicates the priority.

2. The device of claim 1, where the geographic information includes a tracking area identifier associated with the tracking area in which the user device is located.

3. The device of claim 1, where the set of device identifiers includes:
a set of internet protocol (IP) addresses, or
a set of fully qualified domain names (FQDN).

4. The device of claim 1, where the one or more processors, when receiving the geographic information, are to:
receive the geographic information in association with an attach request from the user device.

5. The device of claim 1, where the one or more processors, when receiving the geographic information, are to:
receive the geographic information in association with a tracking area update request from the user device.

6. The device of claim 1, where the one or more processors, when providing the set of device identifiers, are to:
provide multiple device identifiers corresponding to multiple ePDG devices.

7. The device of claim 1,
where the service area is serviced by the device, and
where the device is a mobile management entity (MME).

8. A non-transitory computer-readable medium storing instructions, the instructions comprising:
one or more instructions that, when executed by one or more processors, cause the one or more processors to:
receive, from a user device and via a base station, geographic information indicating a tracking area in which the user device is located;
determine that evolved packet data gateway (ePDG) capability is enabled in a service area associated with the one or more processors;
identify one or more ePDG devices, associated with the geographic information, based on the geographic information after determining that the ePDG capability is enabled in the service area associated with the one or more processors;
determine a priority based on geographic proximity of the tracking area or a cell of the user device to an ePDG device of the one or more ePDG devices;
provide, to the user device, one or more device identifiers associated with the one or more ePDG devices,
the one or more device identifiers being provided in association with a non-access stratum message, and
the one or more device identifiers being used by the user device to access an evolved packet core; and
provide information that indicates the priority.

9. The non-transitory computer-readable medium of claim 8, where the one or more instructions, that cause the one or more processors to receive the geographic information, cause the one or more processors to:
receive a tracking area identifier indicating the tracking area in which the user device is located.

10. The non-transitory computer-readable medium of claim 8, where the one or more instructions, that cause the one or more processors to receive the geographic information, cause the one or more processors to:
receive the geographic information in association with an attach request, or
receive the geographic information in association with a tracking area update request.

11. The non-transitory computer-readable medium of claim 8, where the one or more instructions, that cause the one or more processors to identify the one or more ePDG devices, cause the one or more processors to:
identify multiple ePDG devices that are associated with the geographic information.

12. The non-transitory computer-readable medium of claim 11, where the one or more instructions, when executed by the one or more processors, further cause the one or more processors to:
determine a priority of the multiple ePDG devices, the priority being based on:
respective geographic proximities between the user device and the multiple ePDG devices,
respective amounts of network traffic associated with the multiple ePDG devices, or
respective quantities of user devices using the multiple ePDG devices.

13. The non-transitory computer-readable medium of claim 11, where the one or more instructions, when executed by the one or more processors, further cause the one or more processors to:
determine a priority of the multiple ePDG devices,
the priority of the multiple ePDG devices being based on respective quantities of user devices using the multiple ePDG devices to access the EPC.

14. The non-transitory computer-readable medium of claim 8, where the one or more device identifiers include:
one or more internet protocol (IP) addresses, or
one or more fully qualified domain names (FQDN).

15. A method, comprising:
receiving, by a device and from a user device via a base station, geographic information,
the geographic information indicating a coverage area in which the user device is located;
determining, by the device, that evolved packet data gateway (ePDG) capability is enabled in a coverage area associated with the device;
determining, by the device, an ePDG device, associated with the coverage area, based on the geographic information after determining that the ePDG capability is enabled in the coverage area associated with the device;
determining, by the device, a priority based on geographic proximity of a tracking area or a cell of the user device to the ePDG device;
providing, by the device and to the user device, a device identifier that identifies the ePDG device,
the device identifier being provided in a non-access stratum message, and
the device identifier being used by the user device to access an evolved packet core; and
providing, by the device, information that indicates the priority.

16. The method of claim 15, where the geographic information includes a tracking area identifier of the tracking area.

17. The method of claim 16, where determining the ePDG device associated with the coverage area comprises:
identifying the ePDG device by comparing the tracking area identifier and a set of tracking area identifiers associated with the device identifier.

18. The method of claim 15, where receiving the geographic information comprises:
receiving the geographic information in association with receiving an attach request.

19. The method of claim 15, where receiving the geographic information comprises:
receiving the geographic information in association with receiving a tracking area update request.

20. The method of claim 15, where determining the ePDG device comprises:
determining a plurality of ePDG devices associated with the coverage area,
the plurality of ePDG devices including the ePDG device;
determining a plurality of priority levels corresponding to the plurality of ePDG devices; and
selecting the ePDG device from among the plurality of ePDG devices based on the plurality of priority levels.

* * * * *